United States Patent
Einhaus et al.

(10) Patent No.: US 10,440,636 B2
(45) Date of Patent: Oct. 8, 2019

(54) SYNCHRONIZATION FOR LTE LICENSED ASSISTED ACCESS IN UNLICENSED BANDS

(71) Applicant: Panasonic Intellectual Property Corporation of America, Torrance, CA (US)

(72) Inventors: Michael Einhaus, Darmstadt (DE); Alexander Golitschek Edler von Elbwart, Darmstadt (DE); Sujuan Feng, Frankfurt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/524,580

(22) PCT Filed: Aug. 18, 2015

(86) PCT No.: PCT/EP2015/068954
§ 371 (c)(1),
(2) Date: May 4, 2017

(87) PCT Pub. No.: WO2016/071021
PCT Pub. Date: May 12, 2016

(65) Prior Publication Data
US 2017/0353912 A1    Dec. 7, 2017

(30) Foreign Application Priority Data
Nov. 7, 2014   (EP) .................................. 14192357

(51) Int. Cl.
*H04W 48/12*    (2009.01)
*H04W 56/00*    (2009.01)
(Continued)

(52) U.S. Cl.
CPC ............ *H04W 48/12* (2013.01); *H04L 5/001* (2013.01); *H04L 5/0032* (2013.01);
(Continued)

(58) Field of Classification Search
CPC .. H04W 48/12; H04W 56/001; H04W 72/042
See application file for complete search history.

(56) References Cited

U.S. PATENT DOCUMENTS 10,212,606 B2    2/2019  Gou et al.
2012/0250631 A1  10/2012 Hakola et al.
(Continued)

FOREIGN PATENT DOCUMENTS

WO    2012/106843 A1    8/2012
WO    2013/006988 A1    1/2013
(Continued)

OTHER PUBLICATIONS

3GPP TR 25.913 V9.0.0, "3$^{rd}$ Generation Partnership Project; Technical Specification Group Radio Access Network; Requirements for Evolved UTRA (E-UTRA) and Evolved UTRAN (E-UTRAN) (Release 9)" Dec. 2009, 18 pages.
(Continued)

*Primary Examiner* — Albert T Chou
(74) *Attorney, Agent, or Firm* — Seed IP Law Group LLP

(57) ABSTRACT

The present invention relates to a terminal device adapted to perform Licensed Assisted Access, LAA, synchronization and cell discovery, and data reception and transmission on a licensed carrier and on an unlicensed carrier. The terminal device comprises a reception unit adapted to receive, on the licensed carrier, control information message. The control information message includes synchronization and discovery signal information indicating the position of a synchronization and discovery signal on the unlicensed carrier. The reception unit of the terminal device can receive, on the
(Continued)

unlicensed carrier at the position indicated by the synchronization and discovery signal information, the synchronization and discovery signal. A timing unit adjusts the timing for transmission and reception of data according to the received synchronization and discovery signal.

17 Claims, 10 Drawing Sheets

(51) Int. Cl.
  *H04W 72/04* (2009.01)
  *H04L 5/00* (2006.01)
  *H04L 27/00* (2006.01)
  *H04W 16/14* (2009.01)
  *H04L 27/26* (2006.01)
  *H04W 48/08* (2009.01)
  *H04W 48/16* (2009.01)
  *H04W 74/02* (2009.01)

(52) U.S. Cl.
  CPC .......... *H04L 5/0048* (2013.01); *H04L 5/0094* (2013.01); *H04L 27/0006* (2013.01); *H04W 56/00* (2013.01); *H04W 56/001* (2013.01); *H04W 72/042* (2013.01); *H04L 27/2646* (2013.01); *H04L 27/2673* (2013.01); *H04L 2027/0026* (2013.01); *H04W 16/14* (2013.01); *H04W 48/08* (2013.01); *H04W 48/16* (2013.01); *H04W 74/02* (2013.01)

(56) References Cited

U.S. PATENT DOCUMENTS

| | | | |
|---|---|---|---|
| 2014/0112289 A1* | 4/2014 | Kim | H04W 16/14 370/329 |
| 2016/0073366 A1 | 3/2016 | Ng et al. | |
| 2016/0135148 A1* | 5/2016 | Novlan | H04L 1/00 370/329 |
| 2017/0280331 A1 | 9/2017 | Gou et al. | |
| 2017/0303304 A1* | 10/2017 | Lee | H04W 72/12 |
| 2017/0303306 A1* | 10/2017 | Lee | H04L 1/1854 |
| 2017/0310439 A1* | 10/2017 | Yang | H04L 5/0032 |
| 2017/0353866 A1* | 12/2017 | Gou | H04W 16/14 |

FOREIGN PATENT DOCUMENTS

| | | |
|---|---|---|
| WO | 2013/063808 A1 | 5/2013 |
| WO | 2016/029826 A1 | 3/2016 |
| WO | 2016/039559 A1 | 3/2016 |
| WO | 2016/072000 A1 | 5/2016 |

OTHER PUBLICATIONS

3GPP TR 36.872 V12.1.0, "3$^{rd}$ Generation Partnership Project; Technical Specification Group Radio Access Network; Small cell enhancements for E-UTRA and E-UTRAN—Physical layer aspects (Release 12)," Dec. 2013, 100 pages.
3GPP TS 36.211 V8.9.0, "3$^{rd}$ Generation Partnership Project; Technical Specification Group Radio Access Network; Evolved Universal Terrestrial Radio Access (E-UTRA); Physical Channels and Modulation (Release 8)," Dec. 2009, 83 pages.
3GPP TS 36.211 V9.0.0, "3$^{rd}$ Generation Partnership Project; Technical Specification Group Radio Access Network; Evolved Universal Terrestrial Radio Access (E-UTRA); Physical Channels and Modulation (Release 9)," Dec. 2009, 85 pages.
3GPP TS 36.211 V12.1.0, "3$^{rd}$ Generation Partnership Project; Technical Specification Group Radio Access Network; Evolved Universal Terrestrial Radio Access (E-UTRA); Physical channels and modulation (Release 12)," Mar. 2014, 120 pages.
3GPP TS 36.212 V11.1.0, "3$^{rd}$ Generation Partnership Project; Technical Specification Group Radio Access Network; Evolved Universal Terrestrial Radio Access (E-UTRA); Multiplexing and channel coding (Release 11)," Dec. 2012, 82 pages.
Alcatel-Lucent et al., "Regulatory Requirements for Unlicensed Spectrum," R1-144348 (R1-144226), 3GPP TSG RAN WG1 Meeting #78bis, Agenda Item: 7.3.2.1, Ljubljana, Slovenia, Nov. 6-10, 2014, 26 pages.
Extended European Search Report dated Mar. 30, 2015, for corresponding European Application No. 14192357.3-1870, 8 pages.
International Search Report dated May 10, 2015, for corresponding International Application No. PCT/EP2015/068954, 3 pages.
Ratasuk et al., "License-Exempt LTE Deployment in Heterogeneous Network," IEEE, Aug. 28, 2012, 6 pages.
Sesia et al., "LTE the UMTS Long Term Evolution—From Theory to Practice," Wiley, 2011, Sections 7.2 and 18.2.2, 19 pages.
Notice of Reasons for Rejection, dated Feb. 7, 2019, for corresponding JP Application 2017-516435, 11 pages. (With English Translation).

* cited by examiner

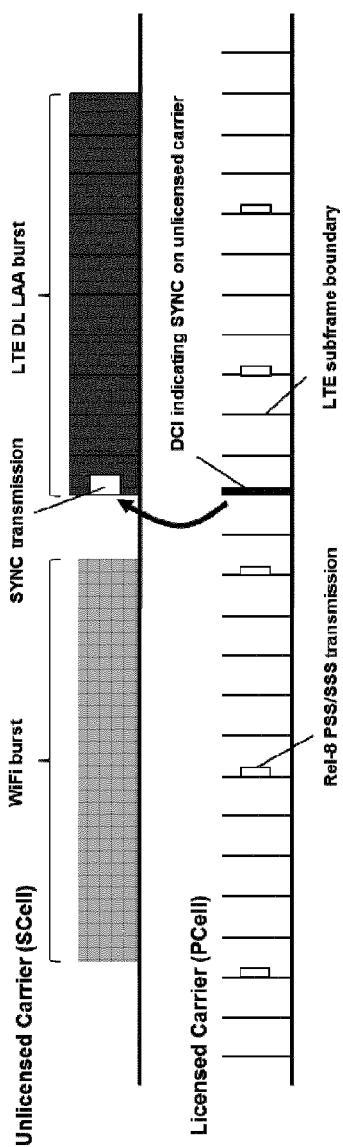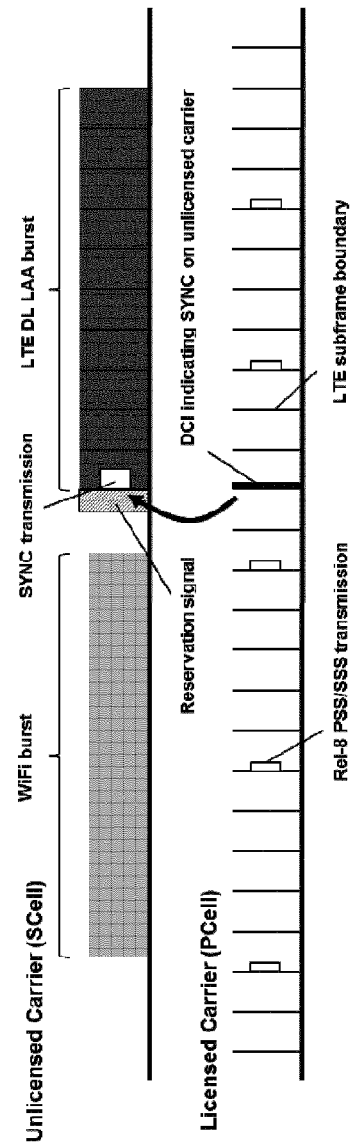
Fig. 8A
Fig. 8B

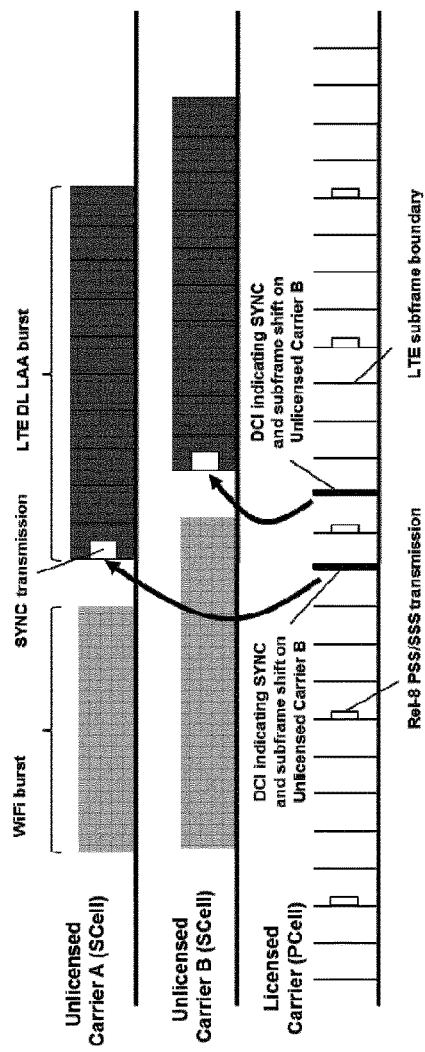
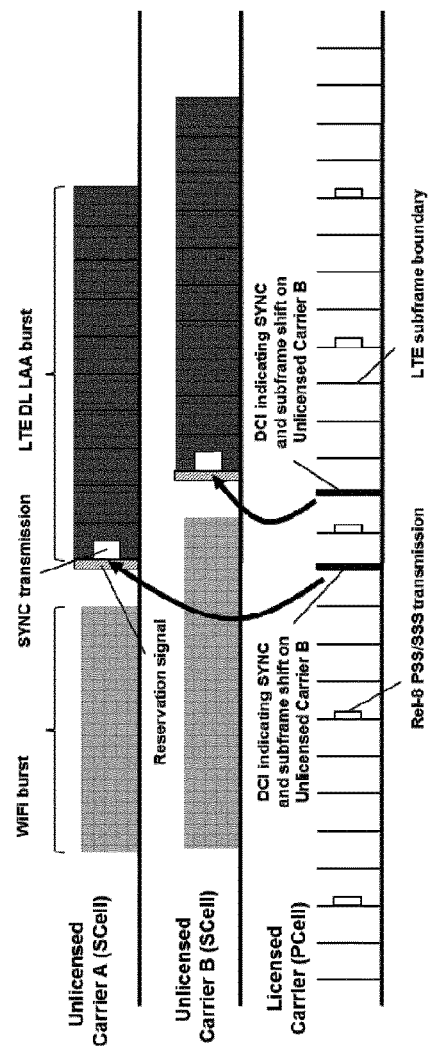

SYNCHRONIZATION FOR LTE LICENSED ASSISTED ACCESS IN UNLICENSED BANDS

The present invention relates apparatuses and methods for performing synchronization in wireless communication systems, where the user equipment is adapted to perform transmission on unlicensed bands. Specifically, the present invention relates to apparatuses and methods that allow performing synchronization for LTE licensed assisted access in unlicensed bands.

BACKGROUND OF THE INVENTION

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive. In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE. The work item (WI) specification on Long-Term Evolution (LTE) called Evolved UMTS Terrestrial Radio Access (UTRA) and UMTS Terrestrial Radio Access Network (UTRAN) is finalized as Release 8 (Rel. 8 LTE). The LTE system represents efficient packet-based radio access and radio access networks that provide full IP-based functionalities with low latency and low cost. The detailed system requirements are given in 3GPP specification TR 25.913, "Requirements for Evolved UTRA and Evolved UTRAN", ver. 9.0.0, freely available at www/3gpp.org.

In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in Rel. 8 LTE.

The overall architecture is shown in FIG. 1 and a more detailed representation of the E-UTRAN architecture is given in FIG. 2. The E-UTRAN comprises eNBs, providing the E-UTRA user plane (PDCP/RLC/MAC/PHY) and control plane (RRC) protocol terminations towards the UE. The eNB hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers. The eNBs are interconnected with each other by means of the X2 interface. The eNBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNBs. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

The downlink component carrier of a 3GPP LTE system is subdivided in the time-frequency domain in so-called sub-frames. In 3GPP LTE each sub-frame is divided into two downlink slots as shown in FIG. 3, wherein the first downlink slot comprises the control channel region (PDCCH region) within the first OFDM symbols. Each sub-frame consists of a given number of OFDM symbols in the time domain (12 or 14 OFDM symbols in 3GPP LTE (Release 8)), wherein each of OFDM symbol spans over the entire bandwidth of the component carrier. The OFDM symbols thus each consist of a number of modulation symbols transmitted on respective $N_{RB}^{DL} \times N_{sc}^{RB}$ subcarriers as also shown in FIG. 3.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 3. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available free of charge at http://www.3gpp.org and incorporated herein by reference). The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Cell search procedures are the first set of tasks performed by a mobile device in a cellular system after initial power-up. Only after the search and registration procedures, a mobile device is able to receive and initiate voice and data calls. A typical cell search procedure in LTE may involve a combination of carrier frequency determination, timing synchronization and identification of unique cell identifier. These procedures are typically facilitated by specific synchronization signals transmitted by the base station (BTS). However, these synchronization signals are not continuously used in connected modes for a mobile device. Hence, only minimum resources in terms of power, subcarrier allocation and time slice are allocated for synchronization signals.

The cell search procedure enables the UE to determine the time and frequency parameters which are necessary to demodulate the downlink and to transmit uplink signals with the correct timing. The first phase of the cell search includes an initial synchronization. Accordingly, the UE detects an LTE cell and decodes all the information required for registering to the detected cell. The procedure makes use of two physical signals which are broadcast in the central 62 subcarriers of each cell, the primary and secondary synchronization signals (PSS and SSS, respectively). These signals enable time and frequency synchronization. Their successful detection provides a UE with the physical cell-ID, cyclic prefix length, and information as to whether FDD or TDD is employed. In particular, in LTE, when a terminal is switched on, it detects the primary synchronization signal, which for FDD is transmitted in the last OFDM symbol of the first time slot of the first subframe (subframe 0) in a radio frame (for TDD the location is slightly different, but still well-determined). This enables the terminal to acquire the slot boundary independently of the chosen cyclic prefix selected for the cell. After the mobile terminal has found the 5 millisecond timing (slot boundaries), the secondary synchronization signal is looked for. Both the PSS and SSS are transmitted on 62 of the 72 reserved subcarriers around the DC carrier. In the next step, the UE shall detect a physical broadcast channel (PBCH) which, similarly to the PSS and SSS is mapped only to the central 72 subcarriers of a cell. The PBCH contains the Master Information Block (MIB) including information about the system resources. In LTE up to Release 10, MIB had a length of 24 bits (14 bits of which are currently used and 10 bits are spare). MIB includes information concerning the downlink system bandwidth, physical HARQ Indicator Channel (PHICH) structure, and 8 most significant bits of the System Frame Number (SFN).

After successful detection of the master information block (MIB) which includes a limited number of the most frequently transmitted parameters essential for initial access to the cell, the terminal activates the system bandwidth, meaning that it has to be able to receive and detect signals across the indicated downlink system bandwidth. After acquiring the downlink system bandwidth, the UE may proceed with receiving further required system information on the so-called System Information Blocks (SIB). In LTE Release 10, SIB Type 1 to SIB Type 13 are defined, carrying different information elements required for certain operations. For instance, in case of FDD the SIB Type 2 (SIB2) includes the UL carrier frequency and the UL bandwidth. The various SIBs are transmitted on a Physical Downlink Shared Channel (PDSCH) and thus (cf. details to PDSCH and PDCCH below) the respective allocations are assigned by a Physical Downlink Control Channel (PDCCH). Before the terminal (UE) is able to correctly detect such (or any) PDCCH, it needs to know the downlink system bandwidth from the MIB.

The above mentioned Cell identity (cell-ID) will identify the cell uniquely within the PLMN. The cell identity is a global cell-ID that is used to identify the cell from an Operation and Maintenance (OAM) perspective. It is transmitted in the System Information and is designed for eNodeB management within the core network. The global cell identity is also used for UE to identify a specific cell in terms of RRC/NAS layer processing. Physical cell identity is the cell identity at physical layer. The physical cell identity has a range of 0 to 503 and it is used to scramble the data to help the user equipment separate information from the different transmitters. A physical cell ID will determine the primary and secondary synchronization signal sequence. It is similar to the Scrambling Codes from UMTS. There are 504 unique physical-layer cell identities. The physical-layer cell identities are grouped into 168 unique physical-layer cell-identity groups, each group containing three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group.

Synchronization signal is composed of a primary synchronization signal (PSS) and secondary synchronization signal (SSS). The sequence used for the primary synchronization signal is generated from a frequency-domain Zadoff-Chu sequence according to $N_{ID}^{(2)}$. By detecting primary synchronization signal, $N_{ID}^{(2)}$ could be detected. The sequence used for the second synchronization signal is an interleaved concatenation of two binary sequences with length of 31 bits. The concatenated sequence is scrambled with a scrambling sequence given by the primary synchronization signal. The SSS sequences are based on maximum length sequences, known as M-sequences, which can be created b cycling through every possible state of a shift register of length n. This results in a sequence of length $2^{n-1}$. In particular, the two 31-bit long binary sequences to be concatenated are such M-sequences. For further details on the primary and secondary synchronization signal, see for example 3GPP TS 36.211, "Evolved Universal Terrestrial Radio Access (E-UTRA); Physical Channels and Modulation (Release 12)", version 12.1.0, section 6.11, available free of charge at http://www.3gpp.org and incorporated herein by reference.

After receiving the PPS and SSS, the timing is adapted by the receiving UE. In particular, the UE synchronizes its receiver to the downlink transmission received from the synchronization source (eNB). Then, the uplink timing is adjusted. This is performed by applying a time advance at the UE transmitter, relative to the received downlink timing in order to compensate for propagation delays varying for different UEs. The timing advance procedure is described concisely in Section 18.2.2 of the book "LTE The UMTS Long Term Evolution: From theory to practice", $2^{nd}$ edition, ed. By S. Sesia, I. Toufik, M. Baker, Wiley, 2011.

Extension of LTE operation on unlicensed spectrum is currently being considered in 3GPP as a possible solution for increasing user and overall cell throughput. The reason for extending LTE to unlicensed bands is the ever-growing demand for wireless broadband data in conjunction with the limited amount of licensed bands. Unlicensed spectrum therefore is more and more considered by cellular operators as a complementary tool augment their service offering. The advantage of LTE in unlicensed bands compared to relying on other radio access technologies (RATs) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum due to the inevitable coexistence with other radio access technologies (RATS) in the unlicensed spectrum. LTE operation on unlicensed bands will therefore at least in the beginning be considered rather a complement to LTE on licensed spectrum than stand-alone operation on unlicensed spectrum. Therefore, solutions being currently developed envisage LTE operation on unlicensed bands in conjunction with at least one licensed band. This scheme is indicated as Licensed Assisted Access (LAA). Future stand-alone operation of LTE on unlicensed spectrum without relying on LAA is however not excluded.

The current intended general LAA approach at 3GPP is to make use of the already specified Rel-12 carrier aggregation (CA) framework as much as possible where the CA framework configuration comprises a so-called primary cell (PCell) carrier and one or more secondary cell (SCell) carriers. CA supports in general both self-scheduling of cells (scheduling information and user data are transmitted on the same carrier) and cross-carrier scheduling between cells, while scheduling information in terms of PDCCH/EPDCCH and user data in terms of PDSCH/PUSCH are transmitted on different carriers.

The basic envisioned approach at 3GPP is that the PCell will be operated on a licensed band, while one or more SCells will be operated on unlicensed bands. The benefit of this strategy is that the PCell can be used for reliable transmission of control messages and user data with high quality of service (QoS) demands, such as for example voice and video, while a PCell on unlicensed spectrum might yield, depending on the scenario, to some extent significant QoS reduction due to inevitable coexistence with other RATs.

It has been agreed during RAN1#78bis, that the LAA investigation at 3GPP will focus on unlicensed bands at 5 GHz (this is described in 3GPP RAN1#78bis Chairman Notes, October 2014). One of the most critical issues is therefore the coexistence with Wi-Fi (see as reference IEEE 802.11 specification) systems operating at these unlicensed bands. In order to support fair coexistence between LTE and other technologies such as Wi-Fi as well as fairness between different LTE operators in the same unlicensed band, the channel access of LTE for unlicensed bands has to abide by certain sets of regulatory rules which depend on region and considered frequency band. A comprehensive description of the regulatory requirements for operation on unlicensed bands at 5 GHz is given in R1-144348, "Regulatory Requirements for Unlicensed Spectrum", Alcatel-Lucent et al., RAN1#78bis, September 2014, which is herein enclosed by reference. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of the 3GPP is to target a single global framework for LAA which basically means that all requirements for different regions and bands at 5 GHz have to be taken into account for the system design.

DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, that is associated with the master, to implement the radar detection.

The operation on unlicensed bands at 5 GHz is in most regions limited to rather low transmit power levels compared to the operation on licensed bands resulting in small coverage areas. A further requirement for certain regions and bands is the use of TPC in order to reduce the average level of interference caused to other devices operating on the same unlicensed band.

Following the European regulation regarding LBT, devices have to perform a Clear Channel Assessment (CCA) before occupying the radio channel. It is only allowed to initiate a transmission on the unlicensed channel after detecting the channel as free based on energy detection. The equipment has to observe the channel for a certain minimum during the CCA. The channel is considered occupied if the detected energy level exceeds a configured CCA threshold. If the channel is classified as free, the equipment is allowed to transmit immediately. The maximum transmit duration is thereby restricted in order to facilitate fair resource sharing with other devices operating on the same band.

Considering the different regulatory requirements, it is apparent that the LTE specification for operation on unlicensed bands will required several changes compared to the current Rel-12 specification that is limited to licensed band operation.

As already briefly discussed, in order receive or transmit data burst, a user equipment (UE) is synchronized to a serving cell. In the LTE system, this synchronization is achieved by the transmission of primary synchronization signals (PSS) and secondary synchronization signals (SSS). These signals are transmitted periodically with a fixed time pattern. This means that once an UE has knowledge of the PSS/SSS transmission pattern, it will know exactly when the next synchronization will be send. The periodic reception of synchronization signals is required for maintaining time, frequency and phase synchronization all the time. A detailed description of the PSS/SSS related procedures given in Section 7.2 of the book "LTE The UMTS Long Term Evolution: From theory to practice", $2^{nd}$ edition, ed. By S. Sesia, I. Toufik, M. Baker, Wiley, 2011.

Within the context of small cell enhancements is it currently discussed at 3GPP to support increased synchronization and discovery signal transmission intervals for the purpose of interference reduction and energy saving. This is described in the contribution TR 36.872 v12.1.0, "Small cell enhancements for E-UTRA and E-UTRAN—Physical layer aspects", December 2013.

The procedures based on primary and secondary synchronization signals (PSS/SSS) have therefore been extended by the concept of configurable discovery reference signals (DRS). The DRS consists in general of a configured combination of PSS/SSS, (common reference symbols) CRS, (positioning reference symbols) PRS, and (channel state information reference symbols) CSI RS together with quasi co-location information (QCI) regarding the different reference symbols. The exact structure of supported DRS configurations is still under discussion at 3GPP, but the general assumption of fixed transmission intervals is still valid.

In the following discussion, synchronization and discovery on unlicensed bands is performed using PSS/SSS. The technical concepts assuming PSS/SSS for synchronization and discovery in unlicensed bands, are however not restricted to PSS/SSS as used by LTE on licensed carriers and the general technical concept can be applied for any DRS configuration (in terms of combinations of different reference signals) as well.

The focus of the invention is the LTE synchronization and discovery of LAA capable UEs in unlicensed bands under the assumption of strong unpredictable interference from other RATs, such as WiFi interference in the 5 GHz spectrum (overlapping cells).

A possible solution for LTE synchronization and discovery in unlicensed bands would be the use of Rel-8 PSS/SSS transmission patterns with a fixed 5 ms duty cycle.

FIG. 6 shows a typical case of collisions between Rel-8 PSS/SSS and a Wi-Fi transmission burst. Here it is assumed that the transmitting LTE node (small cell) performs CCA prior to transmitting a downlink (DL) burst, but not for PSS/SSS transmissions.

Depending on the node positions, the interference caused by the Wi-Fi burst to overlapping PSS/SSS transmissions can be quite severe, making the PSS/SSS undetectable or unusable for the UE intending to perform synchronization and cell discovery in the unlicensed band. The PSS/SSS that are transmitted within the LTE LAA DL burst are implicitly protected from Wi-Fi interference by the LBT procedure performed by the transmitting LTE node. The reason for this implicit protection is that the LTE node will only initiate a burst transmission after the channel has been detected as unoccupied. Since other equipment such as Wi-Fi nodes will perform LBT as well, they will not access the channel after the LTE node started a burst transmission which means that the PSS/SSS transmission within the LTE burst will be protected.

According to the above scheme, which makes use of a transmission pattern with a fixed duty cycle also for LTE in unlicensed bands, the UE can only rely on its own capabilities in terms of PSS/SSS detection even in case of strong interference from other RATs.

Such a scenario was however not foreseen during the Rel-8 PSS/SSS since the assumption was at that time operation in licensed bands with exclusive restriction to the operation of LTE by a single operator. The operator could here for example align the PSS/SSS transmissions of interfering cells in order to facilitate efficient interference cancellation in the UE. This is not possible in unlicensed bands since operators do not have exclusive control over the resource utilization in these bands, the transmission patterns of coexisting RATs (such as IEEE 802.11) are unpredictable and can not be controlled by the LTE operator.

Interference cancelation as a means for improving the PSS/SSS detection/decoding on the UE side would therefore be much more challenging than the corresponding interference cancellation under the assumption of exclusive LTE (PSS/SSS) interference. The unpredictable and uncontrollable Wi-Fi transmission can therefore result in quite long durations between PSS/SSS reception with sufficiently low SINR in order to maintain time and frequency synchronization at the UE all the time.

Another strategy, which envisages increased DRS duty cycles (e.g. 40 ms or 80 ms) is being currently discussed at 3GPP within the scope of small cell enhancements. This solution, however, does not solve the problem of the interference. On the contrary, according to this scheme the UE needs to wait significantly longer for the next DRS transmission than in case of Rel-8 PSS/SSS transmissions with 5 ms duty cycle. Therefore, the choice of increased DRS duty cycles will exacerbate the problem causing a severe synchronization loss in case of a strongly interfered DRS.

Another non-negligible critical issue regarding the transmission of PSS/SSS or any other kind of synchronization and discovery signal, such as DRS (discovery reference signals) in case of small cell enhancements, with fixed duty cycles is that the regulation for unlicensed bands at 5 GHz does in certain regions (such as for example Japan) not allow any kind of transmission without prior CCA performed by the transmitting equipment. Such regulation requirements are described in R1-144348, "Regulatory Requirements for Unlicensed Spectrum", Alcatel-Lucent et al., RAN1#78bis, September 2014. As an example, if the regulatory requirement that is to be taken into account when designing LAA procedures is LBT, the PSS/SSS transmission interval may be increased. This approach corresponds to the DRS approach for small cell on/off with configurable transmission interval currently under discussion at 3GPP. A DRS comprises a combination of PSS/SSS and additional reference signals such as for example CRS (common reference symbols), CSI-RS (channel state information reference symbols) or PRS (positioning reference symbols).

However, also in this approach will not solve the problem due to unpredictable WiFi interference.

SUMMARY OF THE INVENTION

The known solutions presented above do not represent a satisfactory solution to the problem of LAA synchronization and cell discovery in unlicensed bands. In systems where the regulatory requirements do not envisage LBT prior to PSS/SSS transmissions, synchronization and discovery signals for LAA on an unlicensed carrier will be broadcasted irrespective of the transmission of a Wi-Fi burst on the same unlicensed carrier. Such configuration is allowed at least by the European regulation (short signaling transmission). In this case, since the channel is shared between Wi-Fi and LTE, the standard Rel-8 PSS/SSS transmission pattern used for LAA synchronization and discovery will experience strong interference from the Wi-Fi node.

Other regulations, such as the Japanese regulation, require for example LBT prior to each transmission. Under the assumption of LBT prior to PSS/SSS transmissions, the standard Rel-8 PSS/SSS transmission pattern can not be applied since it is not allowed to transmit PSS/SSS if the channels is occupied by Wi-Fi transmissions.

In both cases, the UE will not know in advance when there will be a valid PSS/SSS that can be used for synchronization and cell discovery. In summary, depending on whether regulation requirements, such as for instance LBT, is applied or not, the PSS/SSS might be missing or experience very strong interference which renders it unusable for the purpose of performing LAA synchronization on unlicensed carriers.

The problems described above are solved by providing a terminal device adapted to perform Licensed Assisted Access, LAA, synchronization and cell discovery, and data reception and transmission on a licensed carrier and on an unlicensed carrier. The terminal device comprises a reception unit adapted to receive, on the licensed carrier, control information message. The control information message includes synchronization and discovery signal information indicating the position of a synchronization and discovery signal on the unlicensed carrier. The reception unit of the terminal device can receive, on the unlicensed carrier at the position indicated by the synchronization and discovery signal information, the synchronization and discovery signal. A timing unit the timing for transmission and reception of data according to the received synchronization and discovery signal.

The solution to the mentioned problems also envisages provision of a method for performing, at a terminal apparatus, Licensed Assisted Access, LAA, synchronization and data reception and transmission on a licensed carrier and on an unlicensed carrier. The method comprises the step of receiving, on the licensed carrier, control information including synchronization and discovery signal information, the synchronization and discovery signal information indicating the position of a synchronization and discovery signal on the unlicensed carrier. The synchronization and discovery signal is received on the unlicensed carrier, at the position indicated by the synchronization and discovery signal information. The timing for transmission and reception of data is then adjusted according to the received synchronization and discovery signal.

According to an implementation, a base station is provided, which is adapted to control Licensed Assisted Access, LAA, synchronization and data reception and transmission on a licensed carrier and on an unlicensed carrier. The base station comprises a generating unit adapted to generate control information including synchronization and discovery signal information indicating the position of a synchronization and discovery signal transmitted on the unlicensed carrier. A transmitting unit transmits the generated control information on the licensed carrier, and on the unlicensed carrier, a synchronization and discovery signal at the position indicated in the synchronization and discovery signal information.

A method is further provided for performing Licensed Assisted Access, LAA, synchronization and data reception and transmission on a licensed carrier and on an unlicensed carrier. The method comprises generating control information including synchronization and discovery signal information indicating the position of a synchronization and discovery signal transmitted on the unlicensed carrier. The generated control information is then transmitted on the licensed carrier. The method further includes the step of transmitting, on the unlicensed carrier, a synchronization and discovery signal at the position indicated in the synchronization and discovery signal information.

In this manner, the terminal device can be informed in advance of the transmission of a data burst on the unlicensed carrier and can consequently be prepared to receive the synchronization signal. Since the terminal device receives the control information message on the licensed carrier, it can decode the control information message without experiencing any unexpected interference and retrieve from the received and decoded control information message information on the reception timing of the synchronization signal on the unlicensed carrier. The reception timing of the synchronization signal corresponds to a position information on the unlicensed carrier. Once the reception timing is known at the UE, the latter can be prepared to receiving the synchronization signal on the unlicensed carrier, thereby being able of identifying said signal even in the presence of strong unexpected interference from a RAT transmitting on the unlicensed carrier.

The above objectives and other objectives and features of the present invention will become more apparent from the following description and preferred embodiments, given in conjunction with the accompanying drawings in which:

FIGS. 8A and 8B are schematic drawings illustrating PSS/SSS transmission in unlicensed bands on coexistence with Wi-Fi according to a realization of the present invention;

FIGS. 11A and 11B are schematic drawings illustrating PSS/SSS transmission in unlicensed bands on coexistence with Wi-Fi according to still a different implementation of the present invention;

DETAILED DESCRIPTION

The present invention relates to apparatuses and methods adapted to perform synchronization and cell discovery in wireless communication systems, in which a user equipment (UE) is adapted to perform transmission on unlicensed bands. Specifically, the present invention relates to apparatuses and methods that allow performing synchronization and cell discovery for LTE licensed assisted access in unlicensed bands.

The present invention is based on the observation that, performing LAA synchronization and cell discovery in unlicensed bands based on known PSS/SSS transmission patterns will not give satisfactory results. Specifically, the user equipment will not be able in most cases to receive a usable PSS/SSS either because the PSS/SSS will not be a received at all, as for instance in systems implementing regulatory requirements such as LBT, or because the UE will not be able to use a received PSS/SSS due to strong interference on the unlicensed carrier caused by coexisting RAT nodes.

In the following discussion reference will be made to PSS/SSS. Every aspect described and discussed applies, however, without loss of generality, to any kind of synchronization and discovery signal (such as DRS) as well.

The solution proposed by the present invention in order to solve the problems arising from the use of LTE synchronization signal patterns for performing LAA synchronization and cell discovery in unlicensed bands consists in indicating the transmission of a synchronization and discovery signal on the unlicensed carrier by means of dynamic signaling on an associated unlicensed carrier, which is not affected by any interference due to coexisting RAT nodes.

Figure 7:
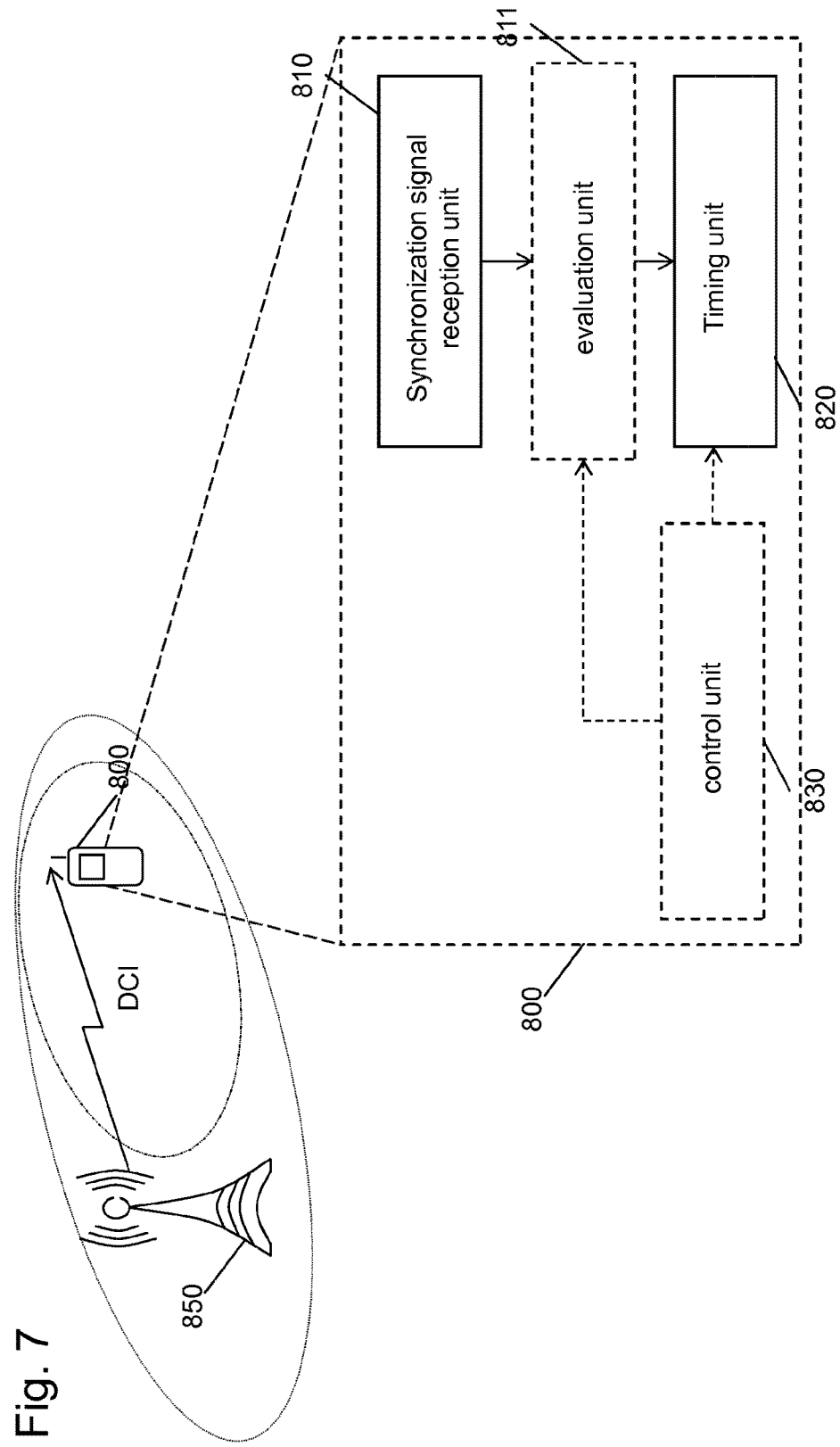
FIG. 7 is a schematic illustration of a system including a base station and a UE according to the present invention.

FIG. 7 is a schematic illustration of a system according to the present invention. The eNodeB 810 serves a Primary Cell (PCell), indicated by a solid line. The UE 800 lies within the PCell served by the eNodeB 810 and within a Secondary Cell (SCell), indicated with a dashed line, which may be operated in an unlicensed band. According to an implementation, the licensed assisted access (LAA) for LTE may be utilized in unlicensed bands within the scope of carrier aggregation (CA). In this context, the Primary Cell is operated in a licensed band while one or more Secondary Cell(s) is operated in unlicensed bands. The dynamic indication of the synchronization and discovery signal on the SCell may be provided by downlink control information (DCI) that is conveyed by either a physical downlink control channel (PDCCH) or an enhance physical downlink control channel (EPDCCH).

Specifically, the user equipment 800, which is adapted to perform data reception and transmission on a licensed carrier and on an unlicensed carrier, comprises a reception unit or synchronization signal reception unit 810, which receives, on the licensed carrier, a control information message or briefly control information. The control information message may be a message, which can be also used for performing scheduling of resources. The control information message includes synchronization and discovery signal information indicating a position of a synchronization and discovery signal on the unlicensed carrier. Upon allocating resources for receiving a data burst on the unlicensed channel, the reception unit 810 receives on the unlicensed carrier, at the position indicated by the synchronization and discovery signal information, the synchronization and discovery signal. Based on the received synchronization and discovery signal a timing and frequency synchronization unit 820 in the terminal device adjusts the timing and frequency synchronization for transmission and reception of data. Optionally, the timing unit 820 can be controlled by a control unit 830. Additional automatic gain control (AGC) for consecutive user data reception can furthermore be performed in the receiving user equipment based on the synchronization and discovery signal.

Similarly, the proposed solution consists in providing a base station 850 adapted to generate a control signal including information indicating when the synchronization and discovery signal, such as a PSS/SSS, can be expected by the UE on the unlicensed carrier. The control information message is sent to the US on the licensed carrier by a base station. The base station may be, for instance an eNodeB or any other transmitting apparatus adapted to control resource assignment for the UE.

The base station 850 is configured to control Licensed Assisted Access, LAA, synchronization and data reception and transmission on a licensed carrier and on an unlicensed carrier. The base station comprises a generating unit adapted to generate control information including synchronization and discovery signal information indicating the position of a synchronization and discovery signal transmitted on the unlicensed carrier. A transmitting unit transmits the generated control information on the licensed carrier. The transmitting unit further transmits, on the unlicensed carrier, a synchronization and discovery signal at the position indicated in the synchronization and discovery signal information.

The block diagram of FIG. 7 only shows the units, which are relevant for the synchronization operations. A skilled person would however be aware that the user equipment 800 and the base station 850 also includes additional units through which any standard operation of a user equipment is performed and/or controlled. Further, it will be clear to a person skilled in the art that the description below refers to features, which are shared by both the user equipment 800 and the base station 850.

The control information received at the UE indicates when a valid synchronization and discovery signal can be expected by the UE on the unlicensed carrier. According to this scheme, upon reception of the control signal, the UE can correctly receive and decode the synchronization and discovery signal for performing synchronization of the subframes on the unlicensed carrier, which will be used for receiving a data burst. The received synchronization and discovery signals may use the Rel-8 PSS/SSS sequence (signal shape) conventionally used for performing synchronization and discovery on the licensed carrier.

Figure 1:
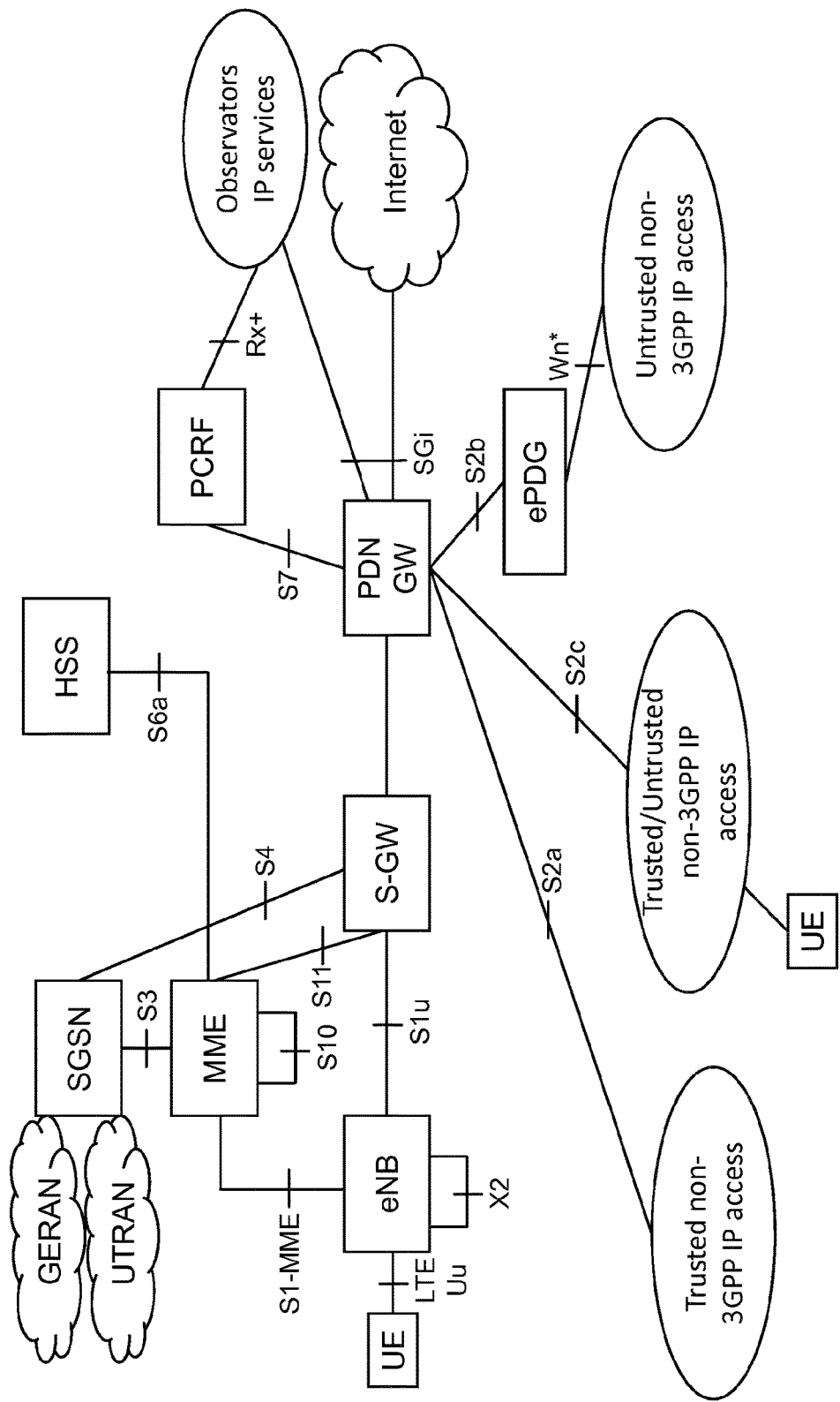
FIG. 1 is a block diagram illustrating an example of an overall LTE architecture.
Figure 2:
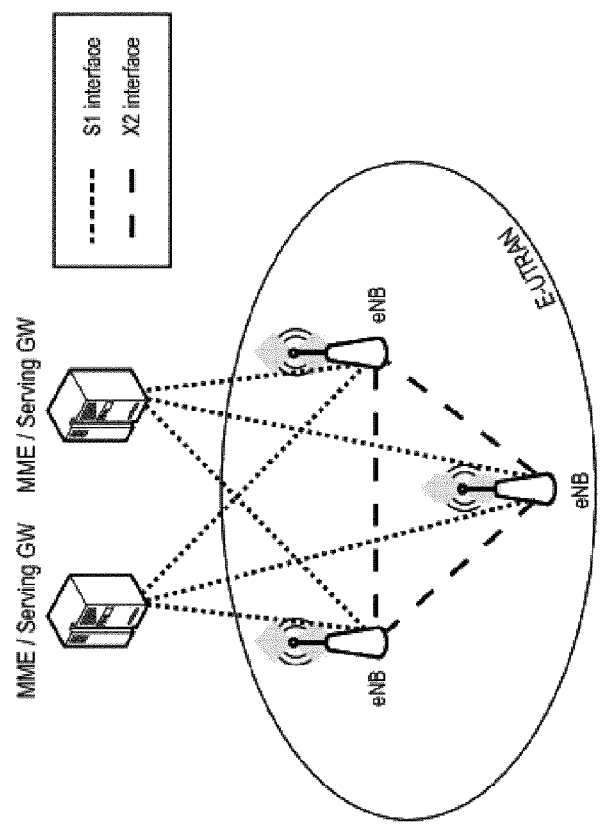
FIG. 2 is a block diagram illustrating an example of an LTE access network architecture.
Figure 3:
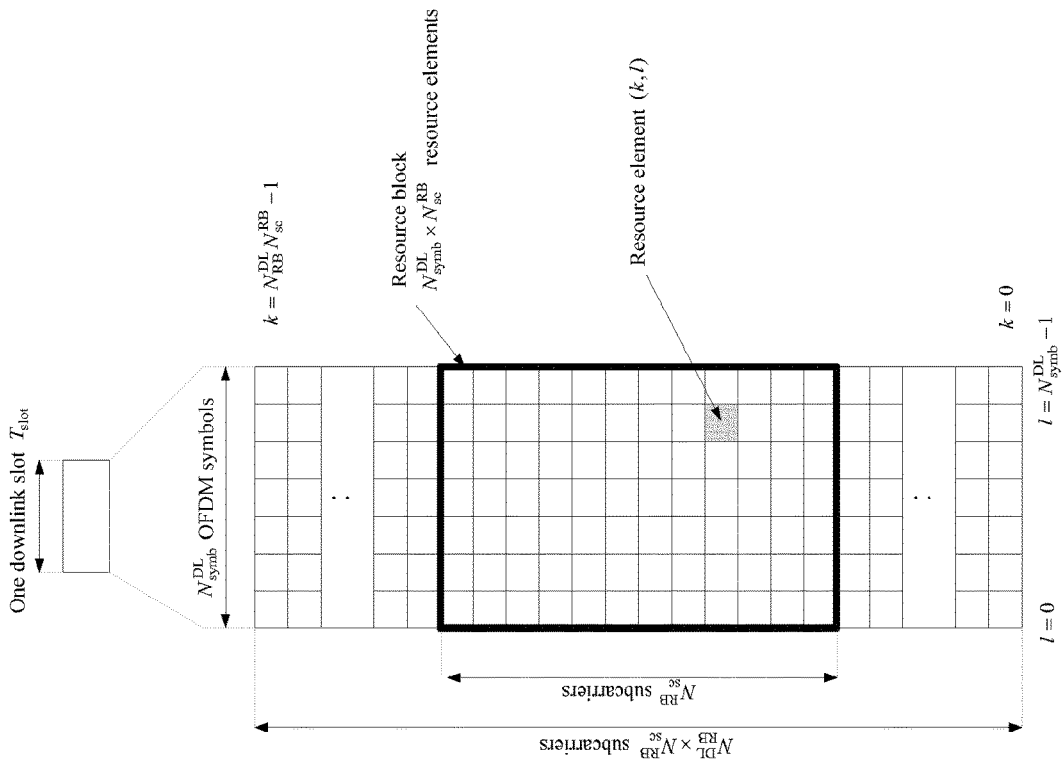
FIG. 3 is a schematic drawing illustrating an example of a grid of OFDM modulation resources in time and frequency domain.
Figure 4:
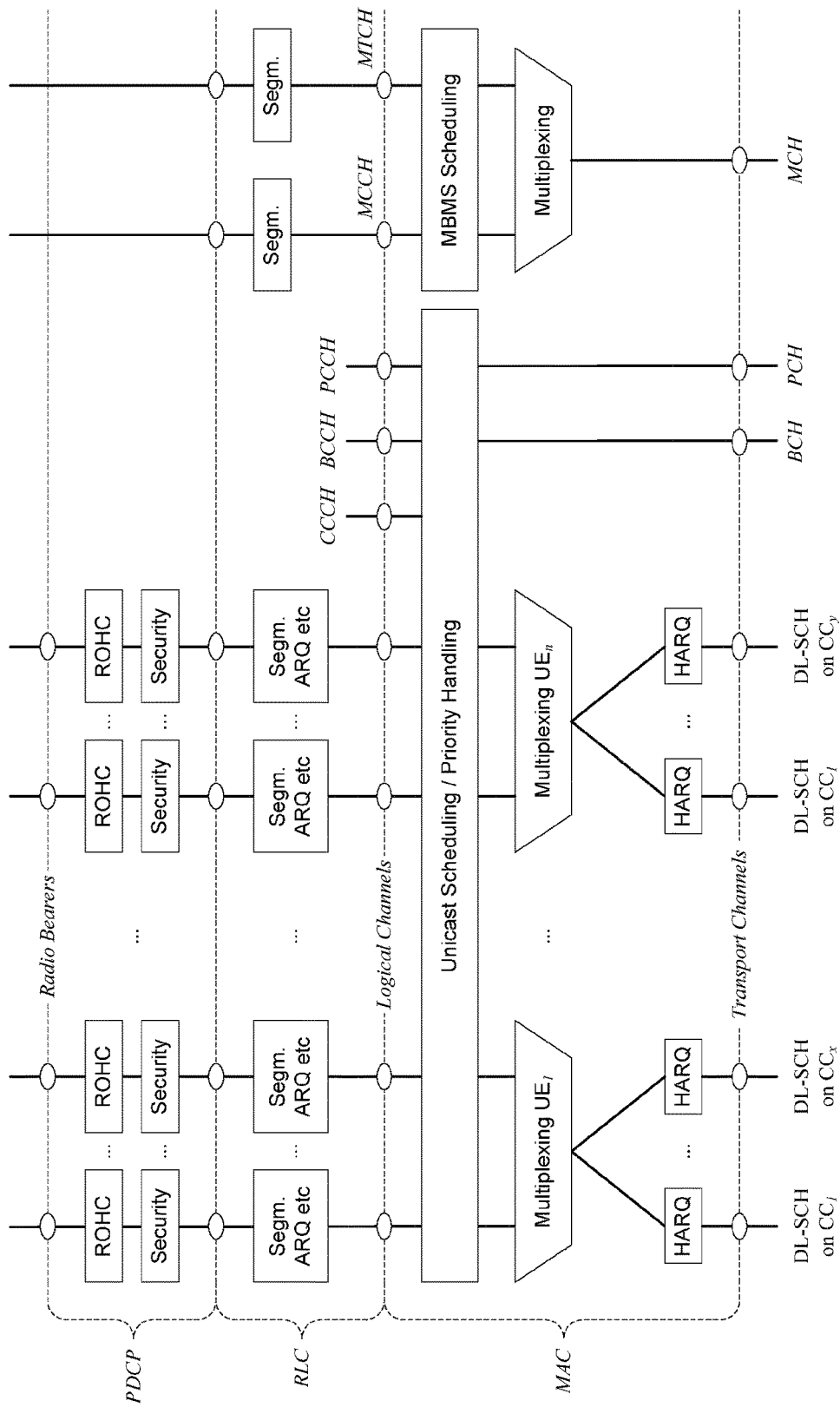
FIG. 4 is a flow diagram illustrating layer 2 downlink protocol and multiplexing structure with configured carrier aggregation.

For the purpose of the present invention, the position of the synchronization and discovery signal on the unlicensed carrier may defined by at least a symbol index offset in the time domain. The symbol index may be, for instance the index of an ODMF symbol in the resource grid as depicted in FIG. 3. In an implementation of the present invention, the subframe boundaries on the unlicensed carrier being aligned to the subframe boundaries on the licensed carrier.

The control information may be scrambled with an LAA Radio Network Temporary Identifier, RNTI. Specifically, on the base station side, the eNodeB may be operable to scramble, at the generating unit, the control information with an LAA Radio Network Temporary Identifier, RNTI. The eNodeB may then transmit, by means of the transmitting unit, the scrambled control information in the common search space. Alternatively, the eNodeB may use, for transmitting the synchronization and discovery information, a control information message, which is designed also for transmitting scheduling information. In this case, the control information message may be directly sent to a pre-determined user equipment. In other words, the generated control information may further include scheduling information for performing scheduling of resources, and the transmitting unit may transmit the control information to a predetermined terminal device.

On the other hand, on the terminal device side, the UE may be adapted to perform blind detection in the common search space of the control information scrambled with an LAA group RNTI. Alternatively, the UE may directly receive the control information, said control information further including scheduling information for performing scheduling of resources.

The control information may further include timing information. The timing information in this context indicates a relative shift of the synchronization and discovery signal relative to the subframe boundary.

In an advantageous implementation the control information received at the user equipment may be a downlink control information (DCI) message. For example, the control information may be a downlink control information message for scheduling downlink resources on the unlicensed carrier. The structure of the DCI will be explained in a more detailed manner in the following discussion.

In a possible realization of the proposed solution, the control information can be transmitted by the base station in a common search space, such as the common search space for downlink control channels (PDCCH or EPDCCH) of the user equipment configured for licensed assisted access (LAA). Alternatively, another realization where the control information is transmitted by the base station in an UE specific search space is possible as well. Accordingly, each of the UEs in the cell will constantly scan the search space looking for control signals addressed to it. Alternatively, the control signals may be directly sent to the UE, which has to receive a specific data burst on the unlicensed carrier.

The DCI used for LAA synchronization may be based on a DCI format for PDSCH indications of one of type 1 to 2D as described, for instance in 3GPP TS 36.212 version 11.1.0 Release 11, section 5.3.3.1 (incorporated herein by reference). Accordingly, the information on the position of the synchronization and discovery signal on the unlicensed carrier may be transmitted in a field already defined in the DCI, such as the RBA field. The position of the synchronization and discovery signal on the unlicensed carrier is univocally identified by indicating the subframe on which the signal is transmitted and its position in the subframe. Referring to the subframe grid block illustrated in figure three, a position in the subframe can be uniquely defined by a frequency index or subcarrier number and by an OFDM symbol index. If PSS/SSS is used as the synchronization and discovery signal, the UE knows already on which subcarrier the PSS and the SSS are transmitted or in other words it knows the transmission frequency of the PSS/SSS. Consequently, in order to univocally define the position of the synchronization and discovery signal, the control information only has to include an indication on the time at which the PSS/SSS will be transmitted. With reference to the grid of OFDM modulation resources in time and frequency domain illustrated in FIG. 3, in order to identify the position of the PSS/SSS on the unlicensed carrier, the UE needs to receive the subframe index and the OFDM index within the subframe.

Another possibility could be reusing the DCI formats for uplink power control (3 or 3A), as described in 3GPP TS 36.212 version 11.1.0 Release 11, section 5.3.3.1 (incorporated herein by reference).

According to this option, which envisages the use of an existing DCI format for indicating the transmission of a synchronization and discovery signal, the UE may further include an identification unit 811 adapted to identify the received DCI, or in other words to distinguish, upon reception of the control information, whether the control information has to be used according to its conventional meaning, i.e. for performing allocation of resources for PDSCH transmission, or whether the control information should be used by the UE as indication of a transmission of a synchronization and discovery signal.

In an advantageous implementation, the cyclic redundancy check (CRC) of the DCI format including synchronization and discovery transmission information may be scrambled with an LAA RNTI (Radio Temporary Network Identifier). In this manner, UEs configured for LAA support can distinguish DCI formats which are transmitted for the purpose of synchronization and discovery from those DCI formats, which are instead transmitted by the eNodeB for the purpose of scheduling of resources. The latter DCI format will have a CRC, which is scrambled with other RNTIs, such as for example a UE specific C-RNTI (Cell Radio Temporary Network Identifier) in case of PDSCH transmission indications.

By checking the CRC of a received DCI format, the UE determines in general whether the transmitted DCI format contains an error. Each possible bit pattern of the overall DCI format is mapped to a certain CRC bit pattern based on an algorithm known on both transmitter and receiver side. If the CRC bit pattern is scrambled on the transmitter side with a certain RNTI from a set of known RNTIs. On the receiver side the UE can perform the same procedure. The procedure includes determining the CRC of the received DCI format bit sequence and scrambling said CRC bit pattern with the different known RNTIs. In this manner, the UE can identify the RNTI that has been used on the transmitter side when the locally determined scrambled CRC sequence coincides with the received scrambled CRC sequence.

With the introduction of an LAA scrambling sequence for the purpose of performing synchronization and cell discovery on the unlicensed channel, the UE will perform blind detection on the common search space of all the LAA capable UEs or on a configured UE specific search space and upon successfully identifying a DCI message addressed to him, the UE will decode the DCI message including the indication on the position of the synchronization signal on the unlicensed carrier. Since the DCI message is scrambled with an LAA RNTI, the UE will note that the received DCI message indicates a synchronization signal on an unlicensed carrier instead of downlink or uplink scheduling of resources.

According to an alternative solution, a new specific DCI may be defined, or one or more existing DCI formats may be extended with bit fields dedicated to the synchronization and discovery signal. Accordingly the UE does not need to decide whether the DCI should be used for synchronization or for scheduling of resources. Specifically, if a specific DCI exclusively dedicated for indication of transmission of a synchronization signal or if an existing DCI format is extended with additional fields dedicated to the synchronization and discovery signal, the UE does not need to perform any evaluation concerning the function of the DCI. According the solution envisaging a new DCI exclusively defined for the synchronization and discovery indication, the CRC may be alternatively scrambled either by an existing RNTI or by a new LAA RNTI.

One possible implementation of new DCI format may contain a bit field for indicating an unlicensed band from a set of semi-statically configured unlicensed bands on which the synchronization and discovery signal is transmitted and a bit field for indicating the synchronization and discovery signal position within the unlicensed band indicated by the bit field for indicating the unlicensed band; a bit field length of K bits could be used for selecting a band out of a set of log 2(K) bands. The semi-static configuration of the set of bands could be achieved by means of higher-layer signaling.

If the position indication is restricted to the time domain since the frequency allocation of the synchronization and discovery signal is assumed to be known, the position indication bit field could for example indicate a time offset relative to the starting time of the DCI transmitted in the licensed band. A bit field length of N bits would allow the indication of log 2(N) offsets. According to a possible implementation, a set of equidistant offsets with OFMD symbol length granularity may be chosen.

If an existing DCI format will be used for conveying the synchronization and discovery signal information, the bit fields described above would overwrite other existing bit fields in the existing DCI format, such as for example the RBA field in DCI formats for PDSCH indications of one of type 1 to 2D as described, for instance in 3GPP TS 36.212 version 11.1.0 Release 11, section 5.3.3.1 (incorporated herein by reference).

If one or more existing DCI formats are extended, it means that the bit fields described above for band and position indication of the synchronization and discovery signal transmission are appended to the considered DCI formats. DCI format 1 may, for example, be extended by K+N bit, where K is the number of bits used for the band indication and N is the number of bit used for the synchronization and discovery signal position within the band.

The use of one or more existing DCI formats extended to also include synchronization and discovery information has the advantage that the signaling overhead in terms of PDCCH or EPDCCH resources is minimized since both the synchronization and discovery information and PDSCH indication will be done within a single PDCCH/EPDCCH. This approach can be beneficial under the assumption that only a single UE will be scheduled with a DL LAA burst.

As already discussed in the introductory portion, with reference to FIG. 3, PSS/SSS, or in general DRS, transmitted according to the common PSS/SSS transmission pattern with a fixed duty cycle, are transmitted, for instance for FDD, in the last OFDM symbol of the first time slot of the first subframe (subframe 0).

In contrast thereto, according to an implementation of the present invention, the control information, or in an advantageous implementation the DCI, including synchronization and discovery information is transmitted at the beginning of a DL LAA burst. Specifically, the synchronization and discovery signal is sent by the eNodeB and received at the UE received in the first subframe of a data burst to be received on the unlicensed carrier. Clearly, the eNodeB sends the synchronization and discovery signal through the transmitting unit, while the UE receives the synchronization and discovery signal at its receiving unit.

According to an advantageous implementation, the terminal device may receive the synchronization and discovery signal on the first symbols of the first subframe of the LAA DL LTE data burst. The subframe boundary on the unlicensed carrier may be shifted with respect to the subframe boundary on the licensed carrier. In this case, the control information may further include shift information, indicating an offset of the subframe boundary on the unlicensed carrier relative to the subframe boundary on the licensed carrier. Alternatively, it is also possible to conceive a realization, where the shift information does not necessarily need to be indicated within the control information. In this case the shift between the subframe boundaries of the unlicensed and licensed carrier may be determined by the UE in terms of blind detection.

This approach guarantees that the UEs scheduled within the burst will be synchronized at the beginning of the burst, so as to allow reception of PDSCHs and further allows to provide synchronization only when it is required, thereby using the resources in a more efficient way.

Figure 6:
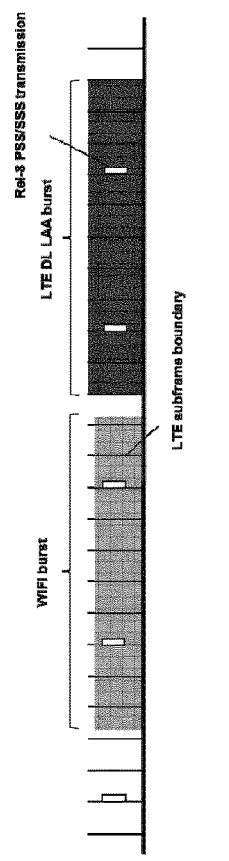
FIG. 6 is a schematic drawing of PSS/SSS transmission in unlicensed bands on coexistence with Wi-Fi in Release 8.
Figure 5:
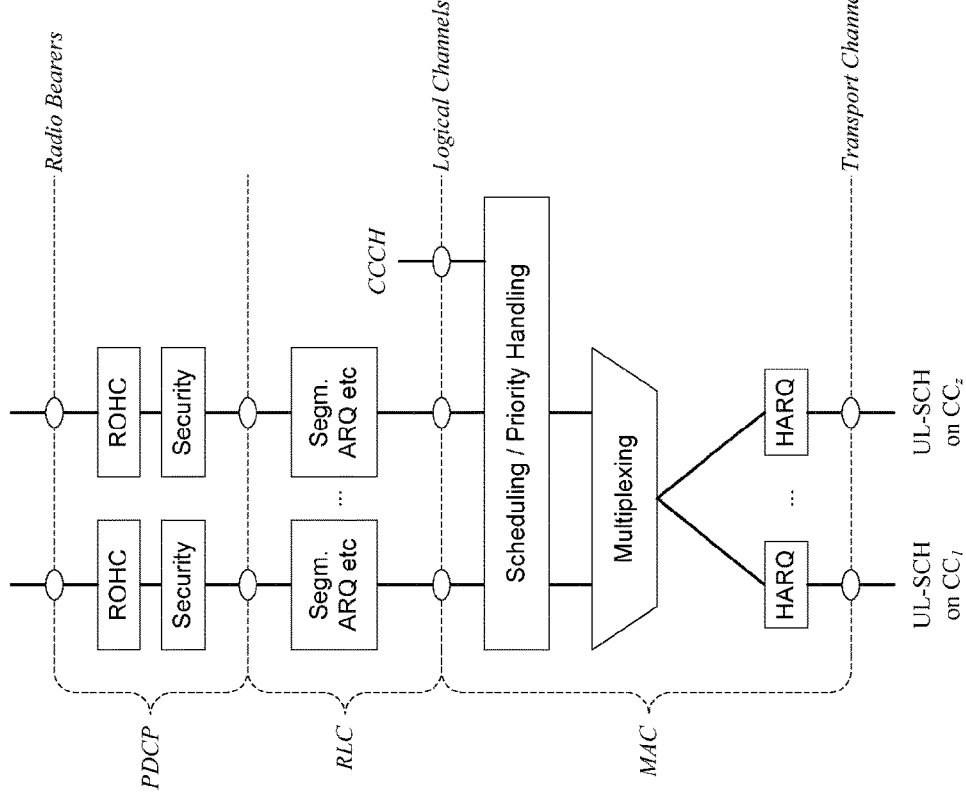
FIG. 5 is a flow diagram illustrating layer 2 uplink protocol and multiplexing structure with configured carrier aggregation.

In contrast to the approach of the present invention, which is based on dynamic transmission of a synchronization and discovery signal at the beginning of LAA DL bursts, common synchronization procedures based on fixed duty cycles, as the PSS/SSS transmission approach described in Rel-8, aim at maintaining UE synchronization all the time irrespective of scheduled DL transmissions for the UE. However, the use of such common PSS/SSS transmission strategy based on a fixed duty cycle for transmitting the DCI including synchronization and discovery information, which does not take into account the LAA DL burst structure, may result in missing synchronization at the LAA DL burst start. This can be seen, for example in FIG. 6, where the first PSS/SSS transmission within the LAA DL burst does not coincide with the first subframe within that burst. The subframes preceding the subframe with the PSS/SSS might therefore not be usable for PDSCH transmissions.

In addition to synchronization (time and frequency) and cell discovery, the signal could be used for the purpose of automatic gain control (AGC) as well.

In a further development of the present invention, the control information may further include a target carrier ID, for identifying the unlicensed carried on which the synchronization and discovery signal is to be received. Based on the target carrier ID included by the base station in the control information, the user equipment can gain knowledge of the specific unlicensed carrier on which transmission of the LAA DL LTE data burst will occur. Although provision of a target carrier ID besides the ODFM signal can be advantageous in any possible configuration, this implementation is particularly advantageous in the case that the system envisages a plurality of unlicensed carrier, on which the user equipment is allowed to receive data. Specifically, in the case that the UE is configured to transmit and receive on a set of unlicensed carriers, the synchronization and discovery information included in the control information (DCI) may indicate by means of the target carrier ID, besides the position of the synchronization signal on the unlicensed carrier, also an identification of one unlicensed carrier from the set of unlicensed carriers. An example of such a system would be given later with reference to FIG. 11.

According to an advantageous implementation, the base station, through the transmitting unit, may transmit a reservation and discovery signal ahead of transmission of the data burst, for occupying the unlicensed channel in terms of blocking other devices from accessing the channel. Similarly, the terminal device and in particular the reception unit, is further adapted to receive a reservation and discovery signal ahead of reception of the data burst, the terminal device performing buffering on the unlicensed carrier in order to detect the reservation and discovery signals.

The present invention further relates to a method for performing licensed assisted access synchronization, cell discovery and data reception and transmission in the telecommunication systems capable of supporting transmissions of data burst on a licensed carrier and on an unlicensed carrier.

The method comprises the steps of generating control information including synchronization and discovery signal information indicating the position of a synchronization and discovery signal transmitted on the unlicensed carrier. The generated control information is transmitted on the licensed carrier, while on the unlicensed carrier, a synchronization and discovery signal is transmitted at the position indicated in the synchronization and discovery signal information. The above described method steps can be performed, for instance, by an eNodeB as base station.

The method may further comprise the additional step of scrambling the control information to an LAA Radio Network Temporary Identifier, RNTI, and transmitting the scrambled control information in the common search space. Alternatively, the control information can be transmitted to a predetermined terminal device. In a particular implementation, the generated control information may further include scheduling information for performing scheduling of resources.

The method may further comprise step of transmitting the synchronization and discovery signal in the first subframe of a data burst to be received by a terminal apparatus on the unlicensed carrier. Specifically, the synchronization and discovery signal may be transmitted on the first symbols of the first subframe. In a particular implementation, the subframe boundary on the unlicensed carrier will be shifted with respect to the subframe boundary on the licensed carrier. In this case, the generated control information may further include shift information, indicating an offset of the subframe boundary on the unlicensed carrier relative to the subframe boundary on the licensed carrier. Alternatively, determination of the shift information may be performed at the UE, for instance in terms of blind detection.

The method according to anyone may, further comprise the step of transmitting a reservation and discovery signal ahead of transmission of the data burst, used occupying the unlicensed channel in terms of blocking other devices from accessing the channel.

The present invention further provides a method for performing, at a terminal apparatus, Licensed Assisted Access, LAA, synchronization, cell discovery and data reception and transmission on a licensed carrier and on an unlicensed carrier. This method comprises the steps of receiving, on the licensed carrier, control information including synchronization and discovery signal information, the synchronization and discovery signal information indicating the position of a synchronization and discovery signal on the unlicensed carrier. The synchronization and discovery signal is received on the unlicensed carrier, at the position indicated by the synchronization and discovery signal information. Further, the timing for transmission and reception of data is adjusted according to the received synchronization and discovery signal.

In the methods of the present invention, the position of the synchronization and discovery signal on the unlicensed carrier is defined by a predefined least an OFDM symbol index offset in the time domain. The control information may further include a target carrier ID, for identifying the unlicensed carried on which the synchronization and discovery signal is to be received.

The method may further comprise the step of performing blind detection of said control information in the common search space. Alternatively, it may include the step of receiving, at the terminal device, the control information, said control information further including scheduling information for performing scheduling of resources.

The method according may further comprise the steps of receiving a reservation and discovery signal ahead of reception of the data burst, and performing buffering on the unlicensed carrier in order to detect the reservation and discovery signals.

The method performed at the terminal operators and the method performed at the base station and described before can of course also be implemented together in a single system. Consequently, the features described with reference to the first method can be also implemented in the method to be performed at the terminal device.

FIGS. 8A and 8B are schematic drawings illustrating PSS/SSS transmission in unlicensed bands on coexistence with Wi-Fi according to a realization of the present invention.

In this realization, subframe boundary of a PCell on the licensed carrier is aligned to the subframe boundary of an SCell on the unlicensed carrier. The synchronization signal is transmitted at the beginning of an LAA DL burst. Specifically, in the example of FIG. 8A, the synchronization signal is transmitted in the first OFDM symbols of the first subframe (subframe 0) of the LAA DL burst. This allows the UE to determine the boundary subframe, which will be aligned with the LTE boundary subframe on the licensed carrier. Further, the synchronization signal will only then transmitted when it is actually required due to a subsequent PDSCH transmission on the unlicensed carrier. In this manner, resources on the unlicensed carrier will not be periodically occupied by a cyclically transmitted synchronization signal.

In other words, the benefit of performing dynamic transmission of synchronization signals is that the synchronization is provided only then when it is required because the UE shall expect reception of a burst of data on a physical channel. In this manner, if the time lapse between two consecutive LAA DL bursts due, for example to high Wi-Fi traffic load, synchronization will only be performed when the necessary resources on the unlicensed carrier for transmission of the LAA DL burst are available on the unlicensed carrier. To do so, the synchronization signal is provided at the beginning of each burst.

The transmission of the synchronization signal is indicated by the eNodeB by means of a corresponding DCI message, as described before in connection with FIG. 7. Specifically, the UE will receive from the eNodeB, on the licensed carrier a DCI message including synchronization and discovery information indicating the position on the licensed carrier at which the UE shall expect the synchronization signal on the unlicensed carrier.

As explained above, the term position used in connection with the synchronization and discovery information has to be intended as the position of the signal within the LAA DL burst. Specifically, the position of the signal can be univocally defined by coordinates in the subframe grid. Accordingly, the synchronization and discovery information may include an index of the OFDM symbol and the subcarrier number(s) indicating the resource elements on which the synchronization signal is transmitted. Since the synchronization signal will be conventionally transmitted at the beginning of the first subframe, an indication of the subframe number does not need to be included in the DCI message for synchronization. Further, in the case that PSS/SSS are used as synchronization and discovery signals, the synchronization and discovery information does not need to include any information on the subcarrier numbers, since PSS/SSS are always transmitted in the same subcarriers.

The fact that the subframe boundaries between PCell and SCell are aligned, has the effect that the synchronization signal and the corresponding DCI are transmitted at the same time.

A further alternative development of the ideas of the present invention envisages the use of a reservation signal, which is sent prior to the synchronization signal in the unlicensed band. The reservation signal could be any kind of signal or energy burst that forces other equipment(s) operating in the unlicensed band to refrain from channel access. A scheme illustrating PSS/SSS transmission in unlicensed bands on coexistence with Wi-Fi, which makes use of a reservation signal, is shown in FIG. 8B. The function of the reservation signal according to the present invention is reserve resources on the unlicensed carrier by blocking the radio channel from being accessed by coexisting RATs, such as Wi-Fi nodes. The LTE node may occupy the unlicensed carrier making use of the reservation signal after a successful CCA. The reservation signal me be any kind of signal or an energy burst, which is sent from the eNodeB on the unlicensed carrier, with the effect that a RAT node, such as a Wi-Fi node, will see the channel as occupied, thereby refraining from accessing said channel. As explained above, the reservation signal is transmitted by the eNodeB directly on the unlicensed carrier. The reservation signal does carry any information for the LAA capable UE. Therefore, said reservation signal does not have to be indicated in the DCI message.

Specific messages of other RATs that have been defined for the purpose of channel reservation such as RTS/CTS (request to send/clear to send) in case of IEEE 802.11 [3] can be used as reservation signals as well. In an implementation of the present invention, the reservation signals may, for example, be transmitted by a Wi-Fi transmission unit located in the same device hosting the LTE transmission unit. An example, of device hosting at the same time a Wi-Fi transmission unit and LTE transmission unit may be, for instance a smartphone or a similar communication node.

Although the transmission of a reservation signal in the unlicensed band may not be indicated by the transmitting LTE node by means of DCI in the licensed band, the reservation signal may be optionally implemented as a specific sequence known by LTE UE. Therefore, depending on the UE implementation, it may be used for enhanced synchronization, such as AGC, etc. Such a specific sequence may, for example, be the Rel-8 PSS/SSS transmission sequence. The PSS/SSS transmission sequence has a length of two OFDM symbols and may be periodically repeated throughout the required length of the reservation signal. By performing blind detection of PSS/SSS sequences in the unlicensed, the UE may discover the repeated PSS/SSS sequence within the reservation signal and use this for the purpose of synchronization and cell discovery.

The use of reservation signals in combination with the transmission of a DCI message for announcing synchronization and synchronization signals for performing LAA synchronization on an unlicensed carrier has the effect of increasing the overall system performance in terms of resource utilization.

According to the example illustrated in FIG. 8B, the reservation signal is received right before the start of the LTE DL LAA burst of data, so that the synchronization signal is transmitted in the first symbols of the first subframe of the data burst.

Figure 9A:
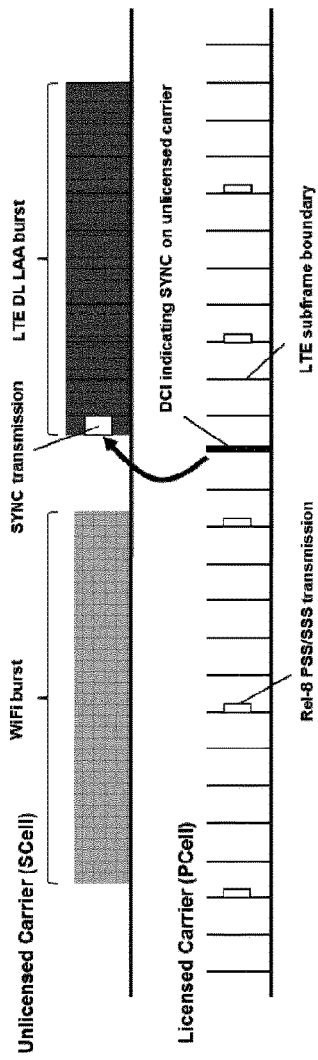
FIGS. 9A and 9B are schematic drawings illustrating PSS/SSS transmission in unlicensed bands on coexistence with Wi-Fi according to a further realization of the present invention.
Figure 9B:
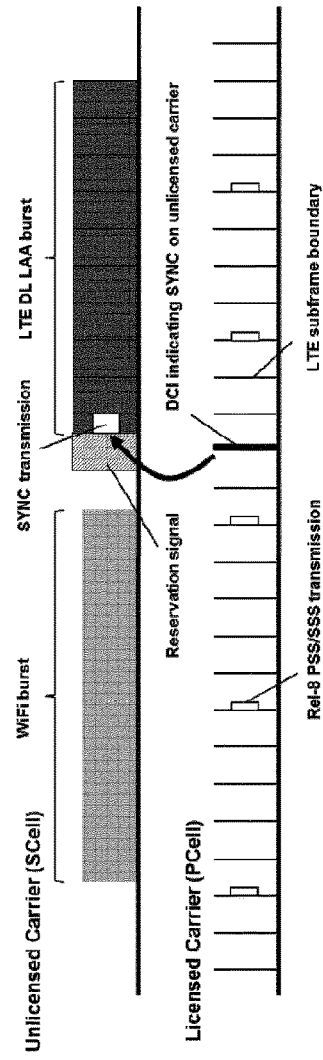

FIGS. 9A and 9B depicts an alternative example of LAA LTE synchronization in unlicensed carriers without and with the use of an additional reservation signal, respectively. According to this realization, the subframe boundaries of the LAA burst on the unlicensed carrier still coincide with the subframe boundaries on the licensed carrier. However, the synchronization and discovery signal is now transmitted on the last symbols of the first subframe of the LAA burst.

This implementation has the advantage that the synchronization and discovery signal transmission on the unlicensed band starts at a later time with respect to the DCI detection and decoding on the licensed band. Consequently, the UE does not need to buffer unlicensed channel sample prior to the DCI decoding.

In contrast thereto, in an implementation where the synchronization and discovery signal transmission can start for example at the same time as the DCI transmission, the UE will not know in advance when the synchronization and discovery signal will be transmitted. Therefore, UE is configured to cyclically buffer unlicensed channel samples.

According to the configuration illustrated in FIGS. 9A and 9B, the delay or offset between the licensed carrier subframe boundary and the synchronization signal transmitted on the unlicensed carrier may be semi-statically configured by means of higher-layer signaling in terms of RRC configuration. Alternatively, the delay or offset may be dynamically indicated within the DCI. A possible implementation of the corresponding bit field has been described above.

Since in this realization the first symbols of the first subframe of the LAA burst are not occupied, the OFDM symbols preceding the synchronization and discovery signal, can be used for transmitting on the unlicensed carrier and the reservation signal. This is shown in FIG. 9B. The function and structure of the reservation and discovery signal are the same as described before with reference to FIGS. 8A and 8B. The reservation signal transmitted on the first symbols of the LAA burst indicates in advance the presence of a synchronization and discovery signal. In this manner buffering of unlicensed carriers samples in the user equipment can be minimized, thereby increasing energy efficiency.

Figure 10A:
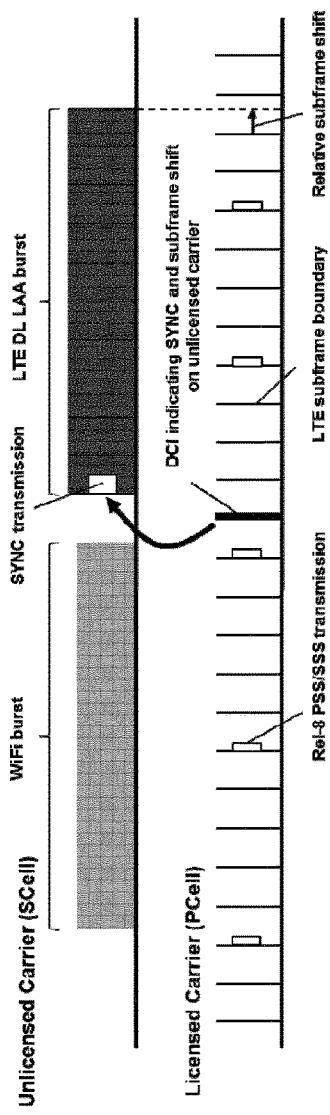
FIGS. 10A and 10B are schematic drawings illustrating PSS/SSS transmission in unlicensed bands on coexistence with Wi-Fi according to still a different implementation of the present invention.
Figure 10B:
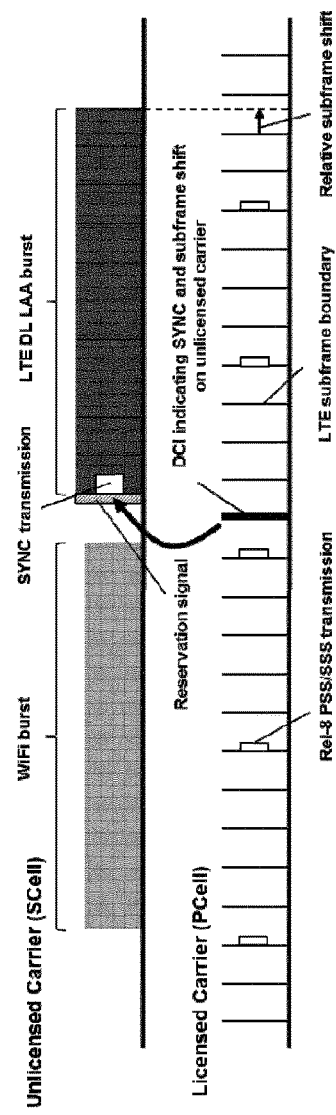

FIGS. 10A and 10B show a further example of LAA LTE synchronization in unlicensed carriers without and with the use of an additional reservation signal, respectively. According to this plantation the subframe boundary of the LAA burst on the unlicensed carrier is not aligned with the subframe boundary on the licensed carrier.

As can be seen in FIG. 10A, the synchronization and discovery signal is transmitted at the beginning of the LAA burst, or in other words within the first OFDM symbols of the first subframe (subframe 0) of the LAA burst. However, since the subframe boundary on the unlicensed carrier does not need to be aligned to the subframe boundary of the licensed carrier but can be chosen to be shifted with respect to the subframe boundary of the licensed carrier, the start of the LAA burst can be adapted to the successful CCA. Specifically, the LAA burst including the synchronization and discovery signal may be started as soon as the channel is determined as free. Advantageously, in an optional implementation transmission of the synchronization and discovery signal may be combined with transmission of a reservation signal prior to the LAA burst in order to provide a certain minimum time shift between DCI in the licensed band and LAA burst start including the synchronization and discovery signal. Consequently, this time shift allows the UE to skip unlicensed channel buffering prior to the DCI decoding. A combination of subframe boundary shifting and additional reservation signal transmission may also be used for maximizing the unlicensed channel resource utilization while minimizing the need for unlicensed channel buffering.

As for the case discussed with reference to FIGS. 9A and 9B, the DCI message may further include an indication of the subframe boundary shift.

FIGS. 11A and 11B schematically illustrate transmission of a synchronization and discovery signal, such as for example PSS/SSS, on multiple carriers on coexistence with Wi-Fi according to an implementation of the synchronization and discovery schemes discussed above. Specifically, FIG. 11 considers and LTE DL LAA bursts, wherein the subframe boundaries on the unlicensed carriers are shifted with respect to the subframe boundaries on the licensed carrier, as discussed previously with reference to FIGS. 10A and 10B. However, it would be clear to a person skilled in the art that the scheme described in FIGS. 11A and 11B may also be implemented using any other team for the subframe boundaries, such as those schemes described with reference to FIGS. 8A to 10B.

Although FIGS. 11A and 11B only show to unlicensed carriers (unlicensed carrier A and unlicensed carrier B), it is clear that the present invention can be as well implemented with an arbitrary number of unlicensed carrier without any limitation. FIGS. 11A and 11B show two unlicensed carriers merrily for explanation purposes.

According to this implementation, the base station may transmit a plurality of control information messages, corresponding to the number of unlicensed carriers. Each of the control information message and specifically the synchronization and discovery information therein includes, besides the indication of the position of the synchronization and discovery signal on the unlicensed carrier, also target carrier information, indicating the unlicensed carrier on which a predefined LAA data burst will be transmitted. Upon receiving the control information message, the UE can therefore, buffer the required amount of subframe on the correct carrier.

Advantageously, in the case that multiple unlicensed carriers are supported for transmission of LAA DL LTE data bursts, the base station may directly indicate the synchronization and discovery signal exclusively to the UE that will be scheduled within the LAA DL LTE data burst. In this manner, user equipments, which do not need to be synchronized to unlicensed carriers, since they do not expect any data transmitted on said unlicensed carriers, will not be scheduled in the unlicensed carrier. Moreover, since the base station directly indicates the synchronization and discovery signal to the actual UE, which is going to receive the data burst, the latter does not have to perform blind detection, thereby improving the energy performance of the system. The description of the control information message and given in the description of FIG. 7 holds true for any of the specific examples made with reference to FIGS. 8 to 11.

Based on the above description should be clear to a skilled person that the idea of the present invention extend also to a telecommunication system for performing Licensed Assisted Access, LAA, synchronization, cell discovery and data reception and transmission on a licensed carrier and on an unlicensed carrier. Accordingly, the telecommunication system comprises a terminal device, which may correspond to the UE and the base station described above.

Another aspect of the invention relates to the implementation of the above described various embodiments and aspects using hardware and software. In this connection the invention provides an user equipment (mobile terminal) and a eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A terminal device adapted to perform Licensed Assisted Access (LAA), synchronization, cell discovery, and data reception and transmission on a licensed carrier and on an unlicensed carrier, the terminal device comprising:
    a receiver which, in operation,
        receives, on the unlicensed carrier, a reservation signal that reserves resources on the unlicensed carrier and blocks other devices from accessing the unlicensed carrier, and
        receives, on the licensed carrier, control information, said control information including synchronization and discovery signal information that includes a position of a synchronization and discovery signal on the unlicensed carrier;
    circuitry which, in operation, allocates resources to receive, on the unlicensed carrier, at the position included in the synchronization and discovery signal information, the synchronization and discovery signal;
        wherein the receiver, in operation, further receives, on the unlicensed carrier, at the position included in the synchronization and discovery signal information, the synchronization and discovery signal,
        wherein, in a case where subframe boundaries on the unlicensed carrier and subframe boundaries on the licensed carrier are aligned with each other and the synchronization and discovery signal is received in a last symbol of an initial subframe of a data burst received on the unlicensed carrier,
            the reservation signal and the control information are received in one or more symbols in the initial subframe that precede the last symbol, and
            the unlicensed carrier is unbuffered; and
    a timing controller which, in operation, adjusts timing for transmission and reception of data according to the received synchronization and discovery signal.

2. The terminal device according to claim 1, wherein the position of the synchronization and discovery signal on the unlicensed carrier is defined by at least an OFDM symbol index offset in a time domain.

3. The terminal device according to claim 1, wherein the control information is a Downlink Control Information (DCI) message.

4. The terminal device according to claim 1, wherein the control information includes a target carrier ID that identifies the unlicensed carrier, on which the synchronization and discovery signal is received.

5. The terminal device according to claim 1, wherein the control information is scrambled by a LAA Radio Network Temporary Identifier (RNTI), and the terminal device, in operation, performs blind detection of said control information in a common search space.

6. The terminal device according to claim 1, wherein the terminal device, in operation, directly receives the control information, said control information including scheduling information for scheduling resources.

7. The terminal device according to claim 2 wherein, in a case where subframe boundaries on the unlicensed carrier and subframe boundaries on the licensed carrier are aligned with each other and the synchronization and discovery signal is received in an initial symbol of the initial subframe of the data burst received on the unlicensed carrier,
    the reservation signal is received prior to the data burst, the control information is received in the initial symbol of the initial subframe, and the unlicensed carrier is buffered.

8. The terminal device according to claim 2 wherein, in a case where subframe boundaries of the unlicensed carrier and subframe boundaries on the licensed carrier are unaligned with each other, the reservation signal and the synchronization and discovery signal are received prior to the data burst received on the unlicensed carrier.

9. A base station adapted to control Licensed Assisted Access (LAA), synchronization, cell discovery and data reception and transmission on a licensed carrier and on an unlicensed carrier, the base station comprising:

circuitry which, in operation,
  generates a reservation signal that reserves resources on the unlicensed carrier and blocks other devices from accessing the unlicensed carrier, and
  generates control information including synchronization and discovery signal information that includes a position of a synchronization and discovery signal transmitted on the unlicensed carrier; and a transmitter which, in operation,
  transmits, on the unlicensed carrier, the generated reservation signal to a terminal device,
  transmits, on the licensed carrier, the generated control information to the terminal device, and
  transmits, on the unlicensed carrier, the synchronization and discovery signal at the position included in the synchronization and discovery signal information to the terminal device, wherein, in a case where subframe boundaries on the unlicensed carrier and subframe boundaries on the licensed carrier are aligned with each other and the synchronization and discovery signal is transmitted in a last symbol of an initial subframe of a data burst received on the unlicensed carrier,
  the reservation signal and the control information are transmitted in one or more symbols in the initial subframe that precede the last symbol, and
  the unlicensed carrier is unbuffered.

10. The base station according to claim 9, wherein the position of the synchronization and discovery signal on the unlicensed carrier is defined by at least an OFDM symbol index offset in a time domain, and subframe boundaries on the unlicensed carrier are aligned with subframe boundaries on the licensed carrier.

11. The base station according to claim 9, wherein the control information includes a target carrier ID that identifies the unlicensed carrier, on which the synchronization and discovery signal is received.

12. The base station according to claim 9, wherein:
the circuitry, in operation, scramble the control information by a LAA Radio Network Temporary Identifier (RNTI), and
the transmitter, in operation, transmits the scrambled control information in a common search space.

13. The base station according to claim 9, wherein the generated control information includes scheduling information for scheduling resources, and the transmitter, in operation, transmits the control information to the terminal device.

14. A telecommunication system for performing Licensed Assisted Access (LAA), synchronization, cell discovery and data reception and transmission on a licensed carrier and on an unlicensed carrier, the telecommunication system comprising:

a terminal device including:
  a receiver which, in operation,
    receives, on the unlicensed carrier, a reservation signal that reserves resources on the unlicensed carrier and blocks other devices from accessing the unlicensed carrier, and
    receives, on the licensed carrier, control information, said control information including synchronization and discovery signal information that includes a position of a synchronization and discovery signal on the unlicensed carrier;
  circuitry which, in operation, allocates resources to receive, on the unlicensed carrier, at the position included in the synchronization and discovery signal information, the synchronization and discovery signal;
  wherein the receiver, in operation, further receives, on the unlicensed carrier, at the position included in the synchronization and discovery signal information, the synchronization and discovery signal,
  wherein, in a case where subframe boundaries on the unlicensed carrier and subframe boundaries on the licensed carrier are aligned with each other and the synchronization and discovery signal is received in a last symbol of an initial subframe of a data burst received on the unlicensed carrier,
    the reservation signal and the control information are received in one or more symbols in the initial subframe that precede the last symbol, and
    the unlicensed carrier is unbuffered; and
  a timing controller which, in operation, adjusts timing for transmission and reception of data according to the received synchronization and discovery signal; and a base station, including:
  circuitry which, in operation, generates the reservation signal and the control information; and
  a transmitter which, in operation,
    transmits, on the unlicensed carrier, the reservation signal to the terminal device,
    transmits, on the licensed carrier, the control information to the terminal device, and
    transmits, on the unlicensed carrier, the synchronization and discovery signal at the position included in the synchronization and discovery signal information to the terminal device.

15. A method of performing Licensed Assisted Access (LAA), synchronization, cell discovery, and data reception and transmission on a licensed carrier and on an unlicensed carrier, the method comprising:

generating, by a base station, a reservation signal that reserves resources on the unlicensed carrier and blocks other devices from accessing the unlicensed carrier;

generating, by the base station, control information including synchronization and discovery signal information that includes a position of a synchronization and discovery signal transmitted on the unlicensed carrier;

transmitting, by the base station and on the unlicensed carrier, the generated reservation signal to a terminal device, transmitting, by the base station and on the licensed carrier, the generated control information to a terminal device; and transmitting, by the base station and on the unlicensed carrier, the synchronization and discovery signal at the position included in the synchronization and discovery signal information to the terminal device,
wherein, in a case where subframe boundaries on the unlicensed carrier and subframe boundaries on the licensed carrier are aligned with each other and the synchronization and discovery signal is transmitted in a last symbol of an initial subframe of a data burst received on the unlicensed carrier,
the reservation signal and the control information are transmitted in one or more symbols in the initial subframe that precede the last symbol, and
the unlicensed carrier is unbuffered.

16. A method of performing, at a terminal apparatus, Licensed Assisted Access (LAA), synchronization, cell discovery, and data reception and transmission on a licensed carrier and on an unlicensed carrier, the method comprising:
receiving, on the unlicensed carrier, a reservation signal that reserves resources on the unlicensed carrier and blocks other devices from accessing the unlicensed carrier;
receiving, on the licensed carrier, control information including synchronization and discovery signal information, the synchronization and discovery signal information including a position of a synchronization and discovery signal on the unlicensed carrier;
allocating resources to receive, on the unlicensed carrier, at the position included in the synchronization and discovery signal information, the synchronization and discovery signal;
receiving, on the unlicensed carrier, at the position included in the synchronization and discovery signal information, the synchronization and discovery signal; and
adjusting timing for transmission and reception of data according to the received synchronization and discovery signal,
wherein, in a case where subframe boundaries on the unlicensed carrier and subframe boundaries on the licensed carrier are aligned with each other and the synchronization and discovery signal is received in a last symbol of an initial subframe of a data burst received on the unlicensed carrier,
the reservation signal and the control information are received in one or more symbols in the initial subframe that precede the last symbol, and
the unlicensed carrier is unbuffered.

17. The method according to claim 16, comprising wherein, in a case where subframe boundaries on the unlicensed carrier and subframe boundaries on the licensed carrier are aligned with each other and the synchronization and discovery signal is received in an initial symbol of the initial subframe of the data burst received on the unlicensed carrier,
the reservation signal is received prior to the data burst,
the control information is received in the initial symbol of the initial subframe, and
the unlicensed carrier is buffered.

* * * * *

UNITED STATES PATENT AND TRADEMARK OFFICE
CERTIFICATE OF CORRECTION

PATENT NO.        : 10,440,636 B2
APPLICATION NO.   : 15/524580
DATED             : October 8, 2019
INVENTOR(S)       : Michael Einhaus et al.

Page 1 of 1

It is certified that error appears in the above-identified patent and that said Letters Patent is hereby corrected as shown below:

In the Claims

Column 22, Claim 7, Line 61:
"The terminal device according to claim 2 wherein, in a" should read --The terminal device according to claim 1 wherein, in a--.

Column 23, Claim 8, Line 4:
"The terminal device according to claim 2 wherein, in a" should read --The terminal device according to claim 1 wherein, in a--.

Signed and Sealed this
Tenth Day of December, 2019

Andrei Iancu
*Director of the United States Patent and Trademark Office*